ated Oct. 2, 1973

3,763,094
COMPOSITIONS STABILIZED WITH TRIS(HY-
DROXYALKYLPHENYL) DERIVATIVES OF
THIOPROPIONYL HEXAHYDROTRIAZINES
Martin Knell, Ossining, and David H. Steinberg, Bronx,
N.Y., assignors to Ciba-Geigy Corporation, Ardsley,
N.Y.
No Drawing. Original application June 1, 1971, Ser. No.
149,048, now Patent No. 3,694,440. Divided and this
application June 15, 1972, Ser. No. 263,338
Int. Cl. C08f 45/58
U.S. Cl. 260—45.8 N                                    7 Claims

ABSTRACT OF THE DISCLOSURE

Organic materials normally subject to oxidative and/or thermal degradation, for example, synthetic polymers such as polyolefins, mineral and synthetic lubricating oils and the like, are stabilized against degradation by incorporating in such compositions tris(alkylhydroxyphenyl) derivatives of thiopropionyl hexahydrotriazines. An example of such compositions is polypropylene stabilized with 1,3,5 - tris(4' - hydroxy-3',5'-di-tert-butylphenylpropionyloxyethylthiopropionyl)-hexahydro-1,3,5-triazine.

This application is a division of copending application Ser. No. 149,048 filed on June 1, 1971, now U.S. Pat. 3,694,440.

DETAILED DISCLOSURE

The compounds of this invention are tris(hydroxyalkylphenyl) derivatives of thiopropionyl hexahydrotriazines which can be represented by the generic formula

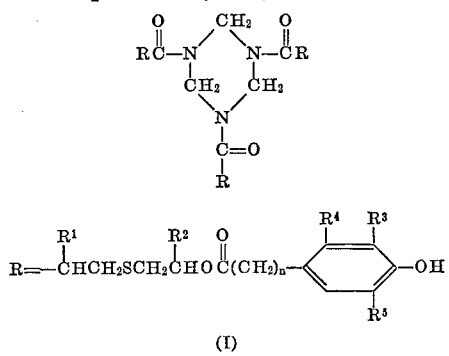

(I)

wherein:

$R^1$, $R^2$ and $R^4$ are independently hydrogen or methyl,
$R^3$ and $R^5$ are independently hydrogen or (lower)alkyl,
and $n$ is 0 to 2.

The groups $R^1$, $R^2$ and $R^4$ are preferably hydrogen. The groups $R^3$ and $R^5$ besides hydrogen can be (lower) alkyl groups having from 1 to 6 carbon atoms. Illustrative examples of such groups are methyl, ethyl, propyl, isopropyl, butyl, tert-butyl, and various isomers of pentyl and hexyl. Preferably, those groups are methyl or tert-alkyl groups such as tert-butyl, tert-pentyl, and tert-hexyl. The value of $n$ is preferably 2.

The compounds of this invention can be prepared by a number of methods available in the art. Following is the description of various methods that can be employed.

The compounds of this invention can be prepared as follows:

(1) 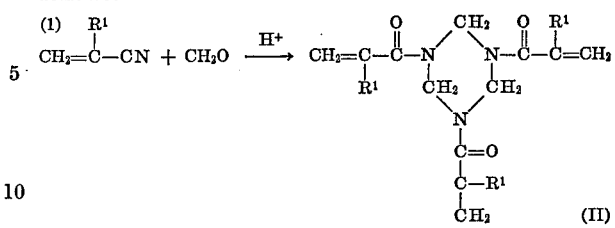

(II)

(2) 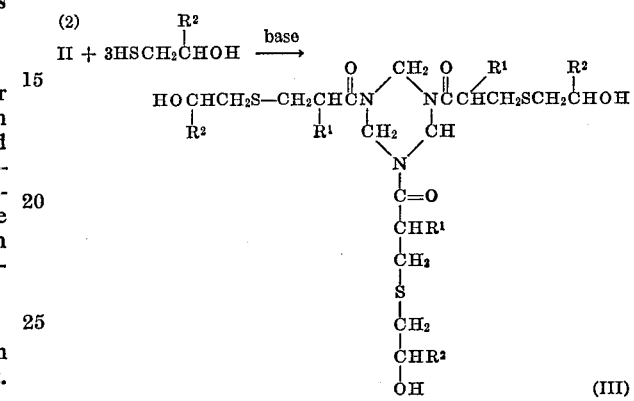

(III)

This reaction is catalyzed by strong bases such as sodium methylate, trimethylbenzylammonium methylate and the like.

(3) 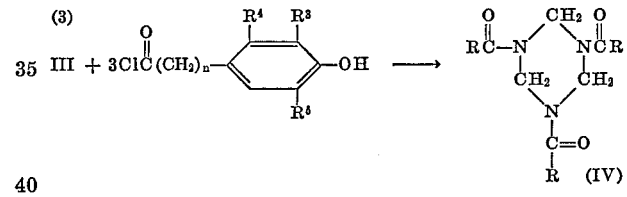

(IV)

This reaction is best carried out in the presence of an acid acceptor such as pyridine, triethylamine, sodium hydroxide, and the like.

Other methods of preparation are, for example, the reaction of mercaptoalkanol with a hydroxyaromatic acid to give a mercaptoalkyl ester which can then be reacted with the tris acrylyl or methacrylyl hexahydrotriazine, e.g.:

(1) 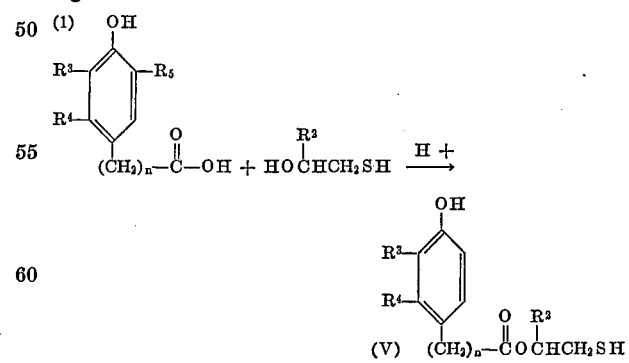

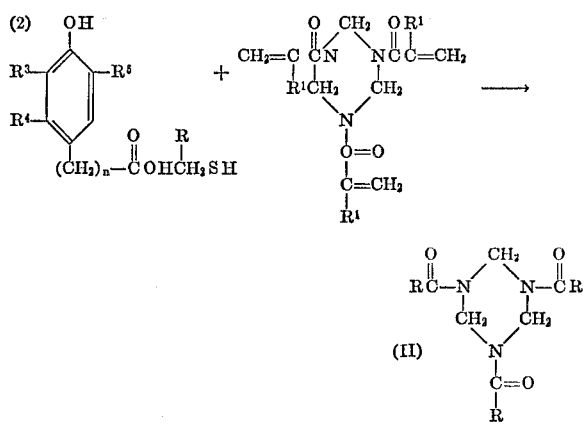

Another method of preparation is as follows:

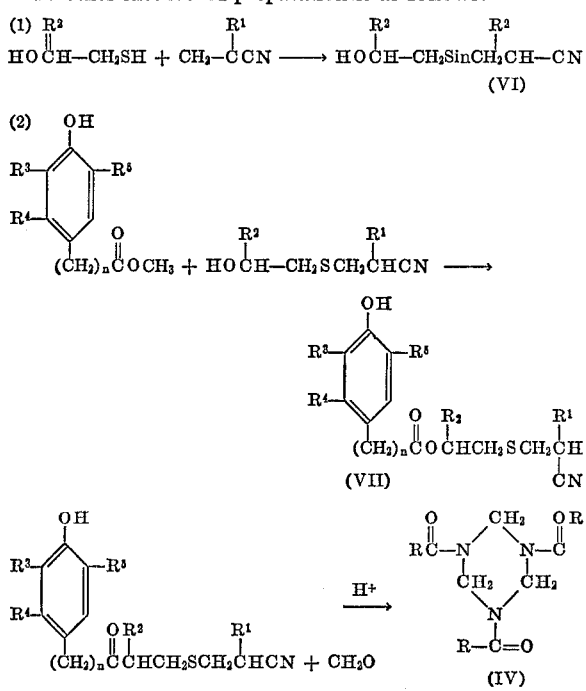

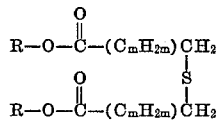

The dialkyl-4-hydroxyphenyl derivatives of thiopropionly hexahydro triazine are useful as stabilizers of organic materials normally subject to oxidative and thermal deterioration. Such organic materials include: synthetic organic polymeric substances such as vinyl resins formed from the polymerization of vinyl halides or from the copolymerization of vinyl halides with vinylesters and unsaturated hydrocarbons such as butadienes and styrene; poly-α-olefins; polyurethanes and polyamides such as polyhexamethylene adipamide and polycaprolactam; polyesters such as polyethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene, and/or styrene.

Other materials which can be stabilized by the compounds of the present invention include lubricating oil of the aliphatic ester type, i.e., di(2-ethylene)-azelate, pentaerythritol tetracaptoate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins, and the like, salts of fatty acids such as soaps and the like.

In general, one or more of the stabilizers of the present invention are employed in amounts, in toto,. of from about 0.005 to about 5% by weight of the composition to be stabilized. A particularly advantageous range of the present stabilizers is from about 0.05% to about 2%. The preferred range is particularly effective in polyolefins such as polypropylene.

These compounds may be incorporated in the polymer substance during the usual processing operations, for example, by hot-milling, the composition then being extruded, pressed, roll-molded or the like into films, fibers, filaments, hollow-spheres and the like. The heat stabilizing properties of these compounds advantageously stabilize the polymer against degradation during such processing at the high temperatures generally encountered.

The stabilizers employed in this invention can also be used in combination with other stabilizers or additives. Especially useful co-stabilizers are dilauryl-β-thiodipropionate and distearyl-β-thiodipropionate.

The following formula represents co-stabilizers which are in certain instances very useful in combination with the stabilizers of this invention:

$$R-O-\overset{O}{\underset{\|}{C}}-(C_mH_{2m})CH_2$$
$$\qquad\qquad\qquad\qquad\overset{\displaystyle O}{\underset{\displaystyle S}{\,}}$$
$$R-O-\overset{O}{\underset{\|}{C}}-(C_mH_{2m})CH_2$$

wherein R is an alkyl group having from 6 to 24 carbon atoms; and m is an integer from 1 to 6. The above co-stabilizers are used in the amount of from 0.01 to 2% by weight of the organic material, and preferably from 0.1 to 1%.

Other antioxidants, antiozonants, thermal stabilizers, ultraviolet light absorbers, coloring materials, dyes, pigments, metal chelating agents, etc., may also be used in the compositions in combination with the stabilizers of the invention.

The following are presented to further illustrate the present invention without introducing any limitation thereto.

EXAMPLE 1

1,3,5-tris(hydroxyethylthiopropionyl)-hexahydro-1,3,5-triazine

To a methanol solution of 1 mole of 1,3,5-triacrylyl-hexahydro-1,3,5-triazine [Wegler, R and Ballauf, A., Ber. 81, 527 (1958)] containing 3 mole percent of trimethylbenzylammonium hydroxide is added dropwise with stirring a solution of 3 moles of 2-mercaptoethanol in methanol. After the addition, the reaction mixture is kept at 35° C. until TLC indicates the reaction is complete, after which it is cooled, filtered from a small amount of insoluble and the solvent stripped under vacuum. The residue is dissolved in water and extracted into isobutyl alcohol. After washing with saturated sodium chloride solution, the solvent is removed under vacuum, leaving a solid residue which is then washed with ether to give the product, 1,3,5-tris(hydroxyethylthiopropionyl) hexahydro - 1,3,5-triazine which melts at 52–4° C.

EXAMPLE 2

1,3,5-tris(4'-hydroxy-3',5'-di-tert-butylphenylpropionyl-oxyethylthiopropionyl)-hexahydro-1,3,5-triazine To a mixture of 0.1 mole of 1,3,5-tris(hydroxyethylthiopropionyl)-hexahydro-1,3,5-triazine in 100 ml. of dry benzene is added a solution of 0.33 mole of 4-hydroxy-3,5-di-tert-butylphenylpropionyl chloride in benzene. Pyridine (0.33 mole) is then added dropwise and the reaction mixture is stirred overnight. After filtering off the solid, the filtrate is washed successively with water, 2 N sodium hydroxide and again with water. The product, 1,3,5-tri(4'-hydroxy-3',5'-di-tert - butylphenylpropionyl-oxyethylthiopropionyl) - hexahydro - 1,3,5 - triazine is purified by elution chromatography from a silica gel column using benzeneheptane (1:1). After drying the product is obtained as a glass which softens at 55° C.

Analysis for $C_{69}H_{105}N_3O_{12}S_3$: Calculated (percent): C, 65.52; H, 8.37; N, 3.32; S, 7.61. Found (percent): C, 65.45; H, 8.24; N, 3.22; S, 7.70.

EXAMPLE 3

Following the procedure of Example 1, only using 1-mercapto-2-propanol instead of 2-mercaptoethanol, there is obtained 1,3,5 - tris(2' - hydroxypropylthiopropionyl)-hexahydro-1,3,5-triazine.

EXAMPLE 4

Following the procedure of Example 2, only using 1,3,5-tris(2'-hydroxypropylthiopropionyl)-hexahydro - 1,3,5-triazine instead of 1,3,5 - tris(2' - hydroxyethylthiopionyl)-hexahydro-1,3,5-triazine and 4-hydroxy-3,5 - di-tert-butylbenzoyl chloride instead of 4-hydroxy-3,5-di-tert-butylphenylpropionyl chloride, there is obatined 1,3,5-tris[2'(4"-hydroxy - 3",5" - di - tert - butylbenzoyloxy) propylthiopropionyl]-hexahydro-1,3,5-triazine.

EXAMPLE 5

Following the procedure of Example 1, only using 1,3,5-trimethacrylyl-hexahydro-1,3,5-triazine instead of 1,3,5-triacrylylhexahydro - 1,3,5 - triazine is obtained 1,3,5-tris-(hydroxyethylthio-α-methylpropionyl)-hexahydro - 1,3,5-triazine.

EXAMPLE 6

Following the procedure of Example 2, only using 1,3,5-tris(hydroxyethylthio-α-methylpropionyl) - hexahydro-1,3,5-triazine instead of 1,3,5-tris(hydroxyethylthiopropionyl)-hexahydro-1,3,5-triazine is obtained 1,3,5-tris(4'-hydroxy-3',5'-di-tert - butylphenylpropionyl oxyethylthio-α-methylpropionyl)-hexahydro-1,3,5-triazine.

Other compounds prepared are as follows:

TABLE I

| $R^1$ | $R^2$ | $R^3$ | $R^4$ | $R^5$ | $n$ |
|---|---|---|---|---|---|
| H | H | $CH_3$ | H | $t-C_4H_9$ | 2 |
| H | H | $t-C_4H_9$ | H | $t-C_4H_9$ | 1 |
| H | H | $t-C_4H_9$ | H | $t-C_4H_9$ | 0 |
| H | H | $CH_3$ | $CH_3$ | $t-C_4H_9$ | 2 |
| $CH_3$ | H | $t-C_4H_9$ | H | $t-C_4H_9$ | 0 |
| H | $CH_3$ | $CH_3$ | H | $t-C_4H_9$ | 2 |

EXAMPLE 7

Unstabilized polypropylene powder (Hercules Profax 6501) is thoroughly blended with 0.5% by weight of 1,3,5 - tris(4'-hydroxy-3',5'-di-tert-butylphenylpropionyl-oxyethylthiopropionyl)-hexahydro - 1,3,5 - triazine. The blended material is then milled on a two-roll mill at 182° C. for 10 minutes, after which time the stabilized polypropylene is sheeted from the mill and allowed to cool.

The milled polypropylene sheets are then cut into pieces and pressed for 7 minutes on a hydraulic press at 218° C., 2,000 pounds per square inch pressure. The resulting sheet of 25 mil thickness is tested for resistance to accelerated aging in a forced draft oven at 150° C. The stabilized polypropylene is found to be much more stable compared to the unstabilized composition.

Stabilized polypropylene compositions are also obtained when 0.05 percent of the above compound is employed.

EXAMPLE 8

To 39.3 g. of hexamethylene diammonium adipate is added 0.177 g. (7.5 x 10 mole; 0.5 mole percent) of hexamethylene diammonium diacetate as molecular weight control agent, and 0.1 percent of theoretical nylon yield of 1,3,5 - tris(4' - hydroxy - 3',5' - di - butylphenylpropionyloxyethylthiopropionyl)-hexahydro - 1,3,5 - triazine. The mixture is blended thoroughly and added to a Pyrex polymer tube.

The polymer tube is evacuated three times and each time filled with high purity nitrogen. The polymer tube with the continuously maintained, slightly positive nitrogen pressure, is placed in a methyl salicylate vapor bath at 220° C. After one hour at 222° C., the polymer tube is transferred to an o-phenyl-phenol bath at 285° C. for one hour. The polymer tube is kept in the 285° C. vapor bath for an additional ½ hour while it is maintained under vacuum of less than 1 mm. pressure. High purity nitrogen is then readmitted and the polymer tube is allowed to cool.

The nylon-6,6 obtained is ground in a mill at ambient temperature of 25° C. About 2 g. are heated in a small glass Petri dish in a circulating air-rotary oven at 140° C. for 65 hours. The viscosity of a 1% sulfuric acid solution of aged and unaged polymer samples are determined at 25° C. Stabilizer effectiveness is judged by the percent retention of specific viscosity, color-formation, and weight retention after oven aging. The stabilized polyamide has better viscosity, color retention and substantially less weight loss than a polyamide which is unstabilized after oven aging.

EXAMPLE 9

High impact polystyrene resin containing elastomer (i.e., butadiene-styrene) is stabilized against loss of elongation properties by incorporation of 0.1% by weight of tris[2'(4"-hydroxy - 3",5" - di-t-butylbenzoyloxy)propylthiopropionyl]-hexahydro-1,3,5-triazine. Under the test conditions described below, the stabilized resin retains a higher percentage of its original elongation properties, whereas the unstabilized resin retains less elongation properties. A substantial improvement in stability is also noted when only 0.05% of the stabilizer is employed.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163° C. and a pressure of 2,000 pounds per square inch into a sheet of uniform thickness (25 mil). The sheets are then cut into strips, approximately 4 x 0.5 inches. A portion of these strips is then measured for length of elongation in the Instron Tensile tester (Instron Engineering Corporation, Quincy, Mass.). The remaining portion of the strips is aged in a forced draft oven for 6 weeks at 75° C. and thereafter tested for elongation. The stabilized polystyrene resin has retained much better its elongation property than the unstabilized resin.

EXAMPLE 10

To 50 g. of polyacetal resin containing an acid scavenger dicyandiamide is added 0.1 percent of 1,3,5-tris(4' - hydroxy - 3',5' - di-t-butylphenylpropionyloxyethylthio-α-methylpropionyl)-hexahydro - 1,3,5 - triazine. The resin containing this additive is milled for 7 minutes at 200° C. in a Brabender Plasti-recorder. The milled formulation is subsequently pressed into a 40 mil sheet at 215° C. at 350° p.s.i. for 90 seconds and then cooled quickly in a cold press at 350° p.s.i. The stabilized sheets are then remolded for 2 minutes at compact pressure and for 3 minutes at 300° p.s.i. at 215° C. to give plaques 1½" x 2¼" x 125 mil. The resulting plaques are tested for resistance to accelerated aging in a force draft oven at 140° C. Unstabilized samples of polyacetal containing only dicyandiamide are tested in the same manner and the results show that the composition containing the above triazine compound is substantially more stable than the unstabilized composition.

What is claimed is:
1. A composition of matter comprising an organic material normally subject to oxidative and thermal degradation and from 0.005 to 5% by weight of said composition of a triazine compound having the formula

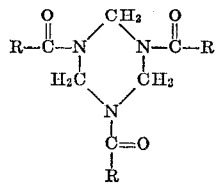

wherein:

R is a group

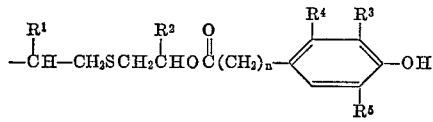

$R^1$, $R^2$ and $R^4$ are independently hydrogen or methyl group,
$R^3$ and $R^5$ are independently hydrogen or (lower)alkyl and
$n$ is an integer 0 to 2.

2. A composition of claim 1 wherein said organic material is a synthetic polymer.
3. A composition of claim 2 wherein said polymer is polypropylene.
4. A composition of claim 2 wherein in said triazine compound $R^1$, $R^2$ and $R^4$ are hydrogen and $R^3$ and $R^5$ are methyl or tert-butyl groups and $n$ is 2.
5. A composition of claim 2 wherein the triazine compound is 1,3,5-tris(4'-hydroxy-3',5'-di-tert-butylphenylpropionyloxyethylthiopropionyl)hexahydro-1,3,5-triazine.
6. A composition of claim 2 wherein the triazine compound is 1,3,5-tris{2'(4''-hydroxy-3'',5''-di-tert-butylbenzoyloxy)propylthiopropionyl}hexahydro-1,3,5-triazine.
7. A composition of claim 2 wherein the triazine compound is 1,3,5-tris(4'-hydroxy-3',5'-di-tert-butylphenylpropionyloxyethylthio-α-methylpropionyl)hexahydro - 1,3,5-triazine.

References Cited
UNITED STATES PATENTS
3,282,888  11/1966  Pines _____ 260—45.8 N DONALD E. CZAJA, Primary Examiner M. J. WELSH, Assistant Examinre U.S. Cl. X.R.

44—64; 99—118 R, 118 F, 118 H, 118 L, 123; 208—19, 21; 252—47.5, 402; 260—45.8 N, 398.5